United States Patent [19]

Koga et al.

[11] Patent Number: 5,004,516
[45] Date of Patent: Apr. 2, 1991

[54] APPARATUS FOR BONDING ADHESIVE RUBBER TAPE TO BOTH EDGES OF A STEEL CORD FABRIC

[75] Inventors: Yukihiro Koga; Yukio Koyama, both of Nagasaki, Japan

[73] Assignee: Mitsubishi Jukogyo Kabushiki Kaisha, Tokyo, Japan

[21] Appl. No.: 334,547

[22] Filed: Apr. 7, 1989

[30] Foreign Application Priority Data

Apr. 7, 1988 [JP] Japan .................................. 63-84064

[51] Int. Cl.⁵ .............................................. B31F 5/08
[52] U.S. Cl. .................................... 156/463; 156/467; 156/477.1
[58] Field of Search ............... 156/212, 216, 201, 202, 156/461, 463, 467, 477.1

[56] References Cited

U.S. PATENT DOCUMENTS

| | | |
|---|---|---|
| 2,557,831 | 6/1951 | Lucenti ............................. 156/467 |
| 2,579,822 | 12/1951 | Homeier et al. .................... 156/467 |
| 2,979,106 | 7/1961 | Brey . | 
| 3,586,581 | 6/1971 | Todd ................................. 156/467 |
| 3,897,943 | 8/1975 | Head et al. . |
| 4,081,304 | 3/1978 | Bruseschi ........................... 156/212 |
| 4,588,463 | 5/1986 | Barber ............................ 156/202 X |

FOREIGN PATENT DOCUMENTS

| | | |
|---|---|---|
| 1704528 | 7/1972 | Fed. Rep. of Germany . |
| 405204 | 3/1940 | Japan . |
| 53-16438 | 1/1978 | Japan ................................. 156/463 |

Primary Examiner—Michael L. Lewis
Attorney, Agent, or Firm—Wenderoth, Lind & Ponack

[57] ABSTRACT

There is disclosed an apparatus for bonding an adhesive rubber tape to both ends of a steel cord fabric. The apparatus comprises a unit for carrying the fabric, a unit for supplying the tape, and unit for folding and bonding the tape to both ends of the fabric. The folding/bonding unit includes a press rollers for bonding a widthwise half of the tape to upper end surfaces of the fabric, oblique rollers for folding an unbonded portion of the tape at both ends of the fabric, and taper rollers for bonding the folded tape to the fabric. The surfaces of oblique rollers are formed of transformable elastic materials, these rollers on each side of the steel cord fabric being disposed at different inclined angles.

3 Claims, 6 Drawing Sheets

APPARATUS FOR BONDING ADHESIVE RUBBER TAPE TO BOTH EDGES OF A STEEL CORD FABRIC

BACKGROUND OF THE INVENTION

1. Field of the Invention

The present invention is directed to an apparatus for consecutively bonding adhesive tapes to end portions of a fabric containing steel cords.

2. Description of the Prior Art

A steel cord fabric utilized as a reinforcing material for a steel radial tire is typically arranged such that a rubber adhesive tape is so bonded to its section (fabric end portion) as to prevent exposure of the steel cord.

For this purpose, there is employed an apparatus disclosed in, e.g., Japanese Patent Publication No. 11344/1977. This type of apparatus will be explained in conjunction with FIGS. 6 through 10.

Turning first to FIG. 6, a rubber tape C passes through a guide plate 9, and is manually bonded to the lower end of a steel cord fabric A. Thereafter, steel cord fabric A is inserted in between a rotary roll 19 and a press roll 20, whereby a half of rubber tape C is bonded to steel cord fabric A. The remaining half (unbonded portion) of rubber tape C is bent in an L-shape at its end with hands. After this process, the subsequent unbonded portion of rubber tape C is further bent in the L-shape by the end surface of a side press roller 22. Next, rubber tap C bent in the L-shape is forced, as illustrated in detail in FIGS. 8 to 10, to sequentially pass through grooved rollers 36, 37 and 38, whereby the tape is folded to seize the end portions of steel cord fabric A in a U-shape. Thereafter, rubber tape C is lightly press-fitted onto the upper surface of steel cord fabric A.

Subsequently, rubber tape C is completely press-fitted while passing through between rotary rolls 49 to 51 and press rolls 52 to 54, and is then wound on a winding shaft 60.

A fold bonding mechanism for adhesive rubber sheet C in the prior art apparatus will then be discussed in greater detail with reference to FIGS. 8 to 10.

FIG. 8 illustrates the section orthogonal to the direction in which fabric A moves forward, passing through the center of grooved rollers 37.

FIGS. 9 and 10 are sectional views depicting grooved rollers 36 and 38 disposed in front and in rear of grooved rollers 37.

Each pair of grooved rollers 36, 37 and 38 are rotatably mounted through bearings on shafts 39 embedded erectly into a pair of support boards 40. Support boards 40 are fixed to one ends of a pair of upper and lower guide pins 41 and 42, while the other ends thereof are slidably supported on a sliding member 43.

Each support board 40 is invariably biased from inside by means of a coil spring 44 provided between sliding member 43 and the board itself, thereby imparting a depressing force on steel cord fabric A to grooved rollers 36 through 38.

The grooved rollers pressed on fabric A is freely rotated by frictional forces after fabric A has been carried. The grooves of rollers 36 to 38 are sequentially narrowed in their widths in the feeding direction of fabric A. The groove width of roller 38 disposed last is substantially equal to a thickness of cord fabric A.

Rubber tape C bonded to both ends of fabric A passes sequentially through grooved rollers 36, 37 and 38. Meanwhile, rubber tape C is folded at the ends of fabric A and is then press-fitted.

There arise, however, the following drawbacks inherent in the prior art. (1) After bonding adhesive rubber tape C to steel cord fabric A, fabric A in turn passes through between a pair of rollers 19 and 20. In the meantime, it is required that the end of adhesive rubber tape C be manually bent in the L-shape. Consequently, the folding process of rubber tape C can not completely be automated. (2) In order to fold and press-fit adhesive rubber tape C at both ends of steel cord fabric A, grooved rollers 36, 37 and 38 are pressed down on the end portions of fabric A, and the resultant frictional forces cause grooved rollers 36 through 38 to freely rotate. If a velocity at which steel cord fabric A is carried increases to enhance the productive capability, however, rotational resistances of grooved rollers 36 through 38 augment. As a result, slippage takes place between fabric A and grooved rollers 36 to 38. This in turn causes a difference between the velocities and creases on rubber tape C. Besides, the air permeates in between rubber tape C and steel cord fabric A. These drawbacks are combined to deteriorate the quality of product.

SUMMARY OF THE INVENTION

It is a primary object of the present invention which is made to obviate the foregoing problems incidental to the prior art to provide an apparatus for bonding an adhesive tape to both ends of a steel cord fabric, comprising: press rollers for bonding an adhesive tape to the upper surfaces of both ends of a steel cord fabric; and folding rollers for folding an unbonded portion of the adhesive tape at both ends of the steel cord fabric, surfaces of said folding rollers being formed of elastic materials transformable in accordance with configurations of end surfaces of the steel cord fabric, and said folding rollers being mounted with inclinations to the steel cord fabric.

According to the invention, there is also provided taper rollers for further pressing down the adhesive tape on the steel cord fabric, which has already been bonded to this fabric.

Based on such constructions, it is possible to eliminate the necessity for the manual operation at the end of the adhesive rubber tape and attain the complete automation. Furthermore, the productive capability can be ameliorated by increasing a velocity at which the steel cord fabric is carried.

BRIEF DESCRIPTION OF THE DRAWINGS

Other objects and advantages of the invention will become apparent during the following discussion in conjunction with the accompanying drawings, in which.

DETAILED DESCRIPTION OF THE PREFERRED EMBODIMENTS

Figure 1:
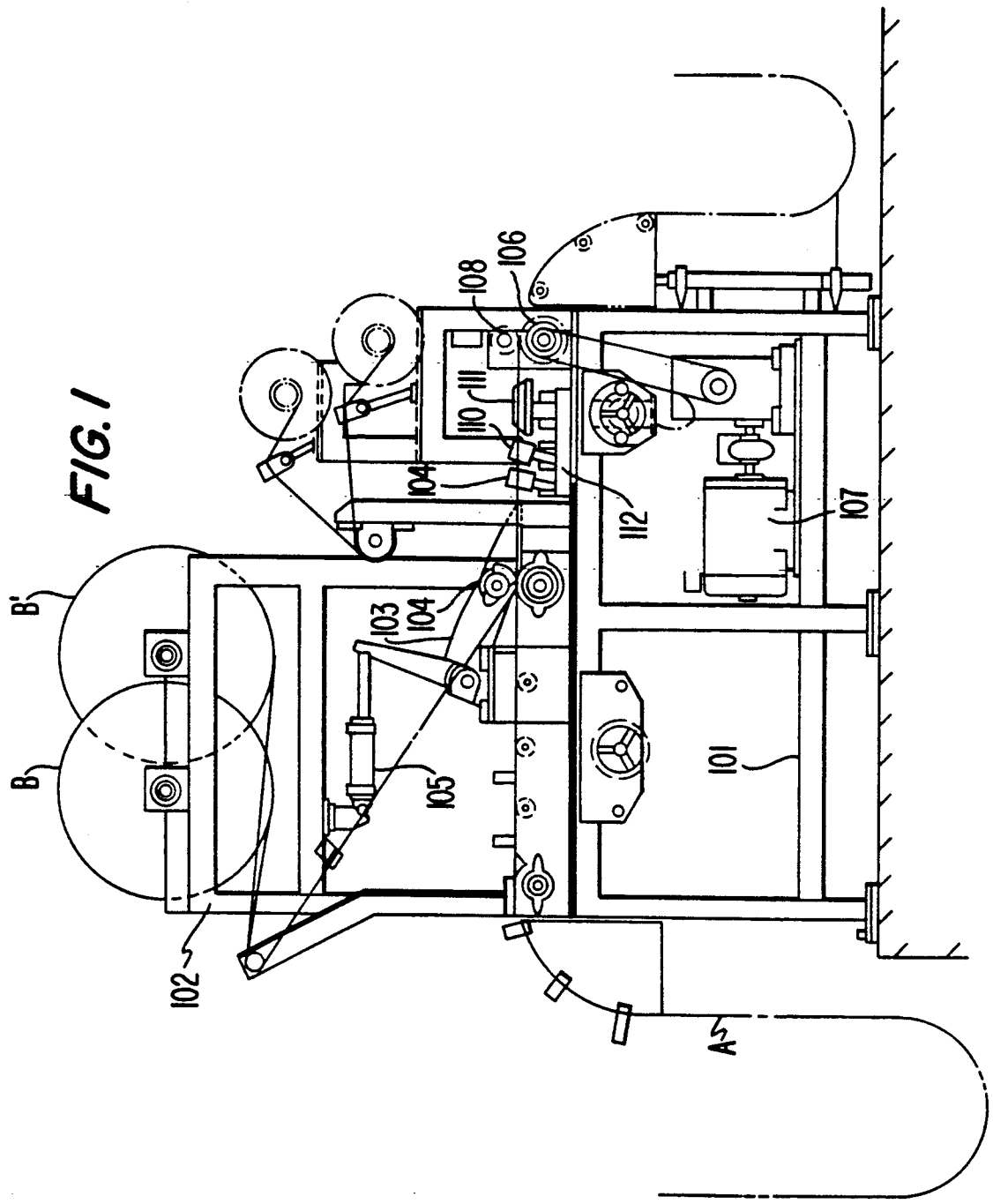
FIG. 1 is an entire front elevation showing an embodiment of the present invention.

Turning firs to FIG. 1, there is illustrated a front elevation of an apparatus as a whole according to the present invention. In FIG. 1, the reference numeral 101 represents a body frame; and 102 designates an adhesive tape receiving board, disposed upwardly of body frame 101, for supporting rolled rubber tapes B and B' each having adhesivity. The numeral 103 denotes a guide holder, fitted at its top end with press rollers 104, for guiding and holding the pair of rubber tapes B and B'. The numeral 105 stands for a driving unit for driving press rollers 104.

Figure 3:
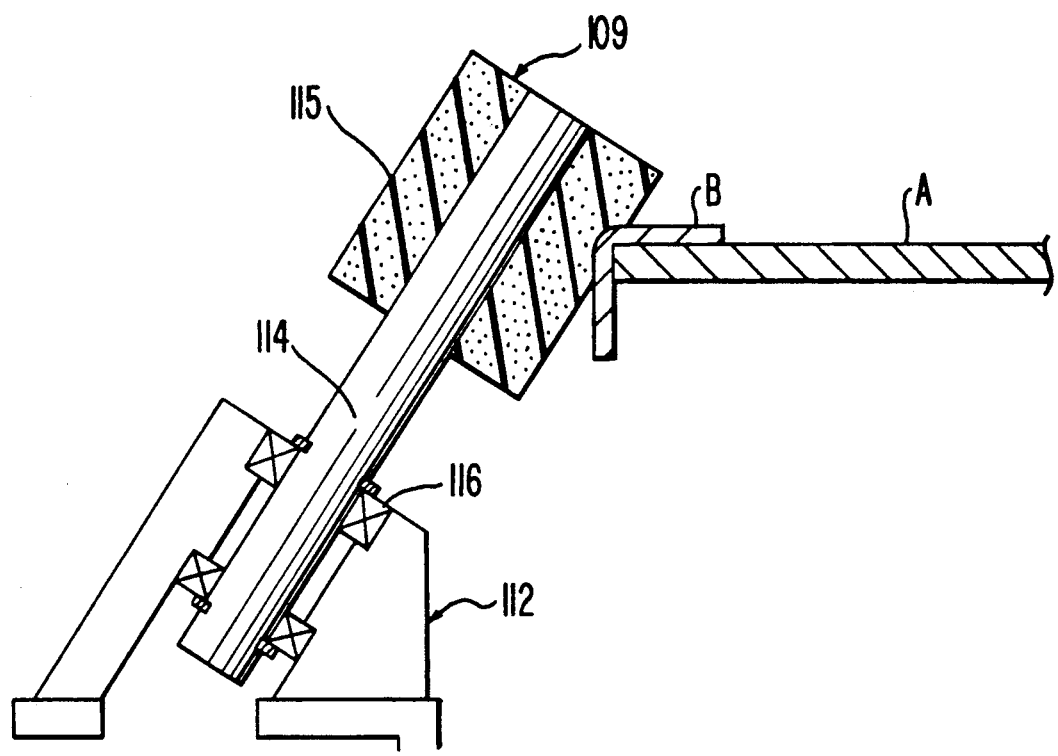
FIG. 3 is a sectional view taken substantially along the line X—X of FIG. 2.
Figure 4:
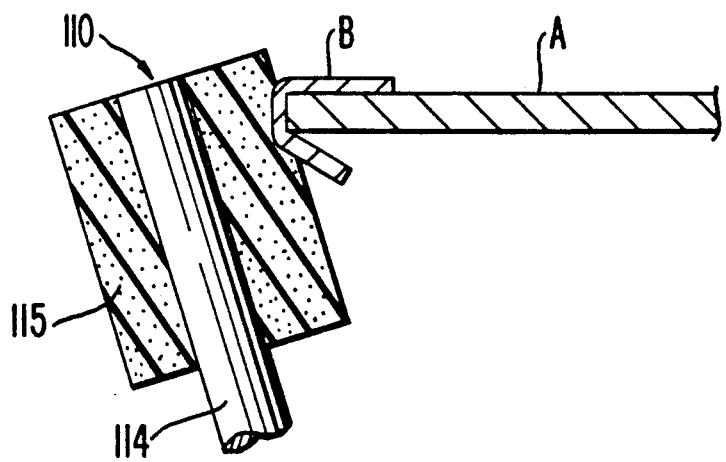
FIG. 4 is a sectional view taken substantially along the line Y—Y of FIG. 2.

Carrier driving rollers generally designated at 106 are adapted to carry a steel cord fabric A, and are also driven by a motor 107 through a power transmission unit such as a chain or the like. The numeral 108 represents a press roller. Steel cord fabric A is made to pass through between press rollers 108 and driving rollers 106. Each pair of oblique rollers 109 and 110 provided at both ends of steel cord fabric A have their surfaces formed of elastic materials such as a sponge or the like. These rollers 109 and 110 are, as depicted in FIGS. 3 and 4, disposed at different angles inclined to the end surfaces of steel cord fabric A. The numeral 111 represents a pair of fan-shaped taper rollers provided at both ends of steel cord fabric A. The above-mentioned rollers 109, 110 and 111 are rotatably mounted on a pair of sliding brackets 112. Sliding brackets 112 are screw-fitted to a shaft 113 including screw threads formed at both ends in the directions opposite to each other with the steel cord fabric movement center serving as a boundary. The pair of sliding brackets 112 are capable of getting close or apart from each other by rotating shaft 113, whereby spacings between rollers 109, 110 and 11 can respectively be adjusted to the width of steel cord fabric A.

Figure 2:
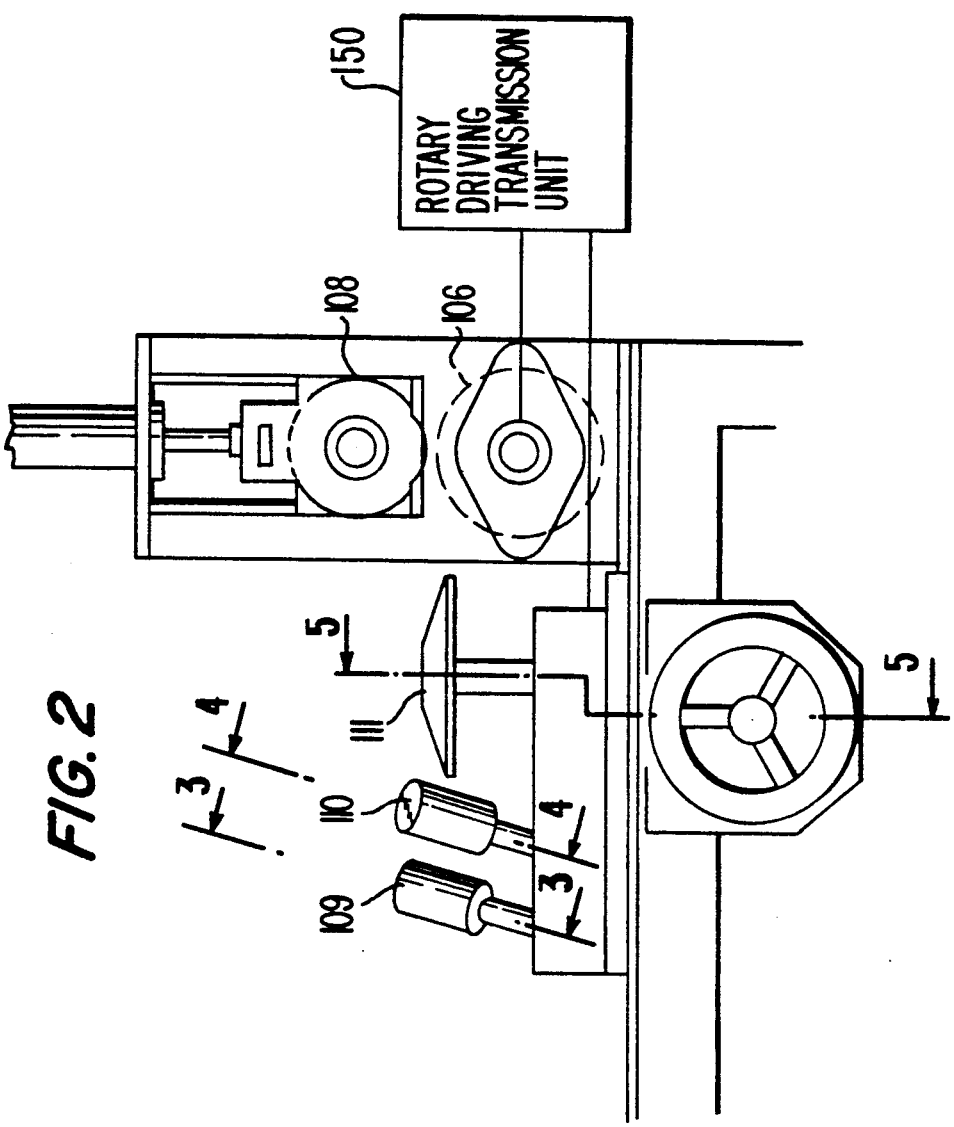
FIG. 2 is an enlarged view illustrating rollers of FIG. 1.

FIG. 2 is an enlarged view depicting a unit on which individual rollers 109, 110 and 111 are mounted.

FIG. 3 is a sectional view taken substantially along the line X—X of FIG. 2.

FIG. 4 is a sectional view taken substantially along the line Y—Y of FIG. 2.

Figure 5:
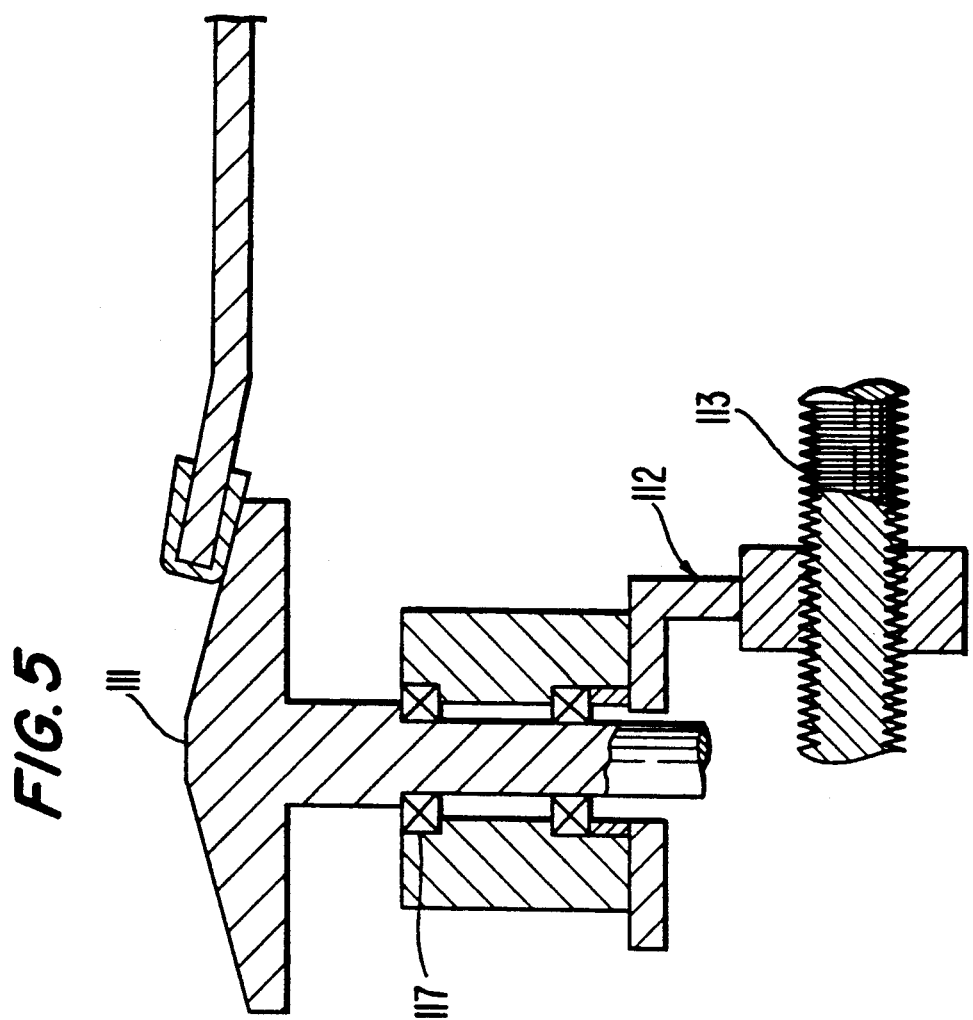
FIG. 5 is a sectional view taken substantially along the line Z—Z of FIG. 2.
Figure 6:
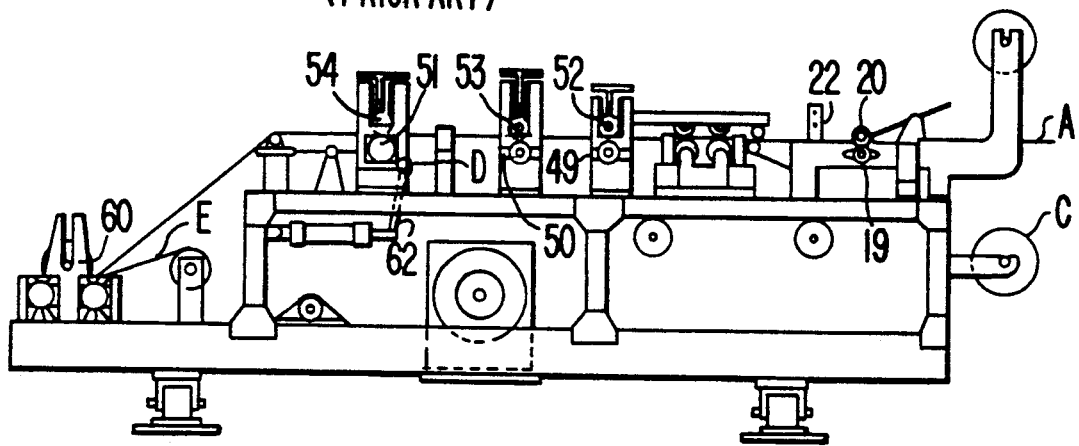
FIG. 6 is an entire front elevation depicting a conventional apparatus.
Figure 7:
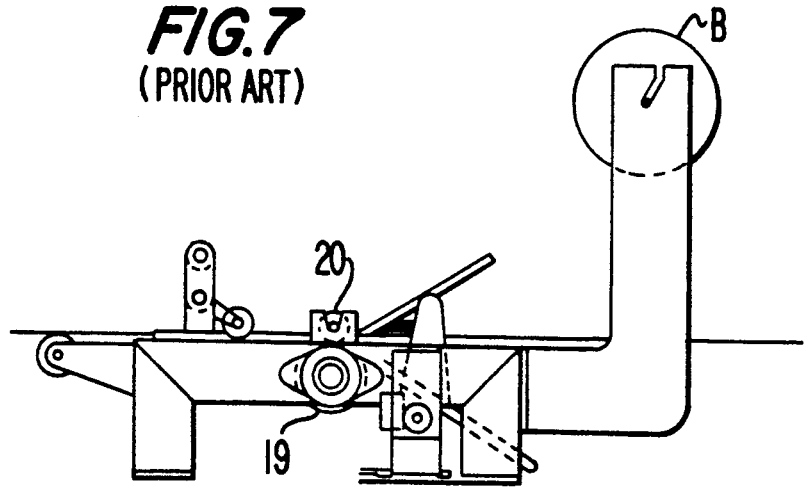
FIG. 7 is an enlarged view depicting the principal portion of FIG. 6.
Figure 8:
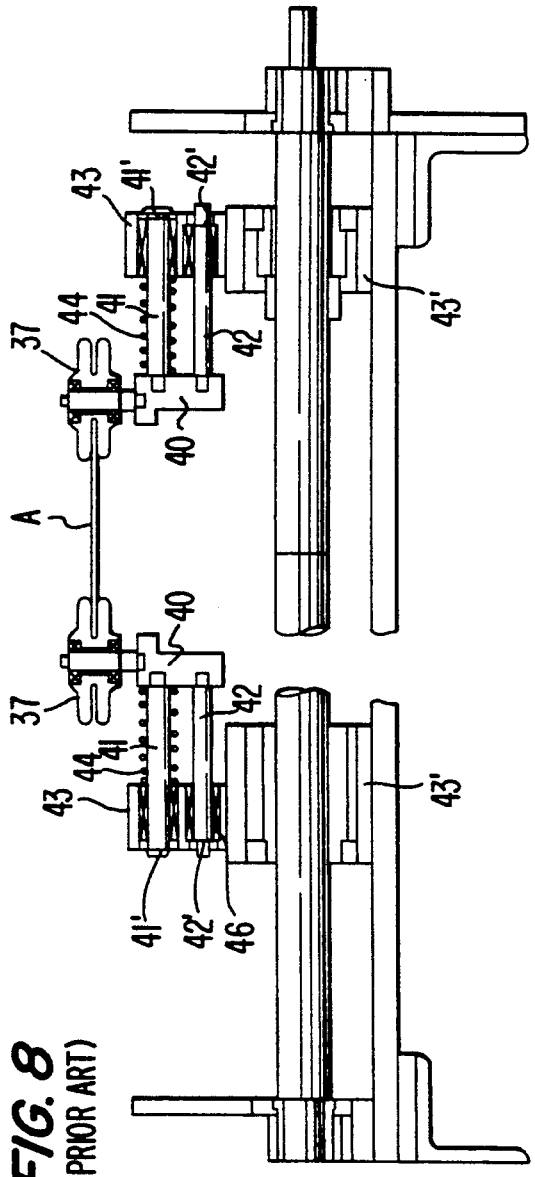
FIGS. 8 through 10 are views of assistance in explaining the operations of grooved rollers.
Figure 10:
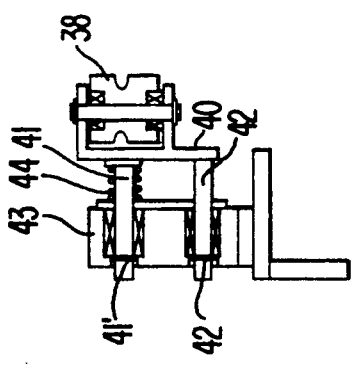
Figure 9:
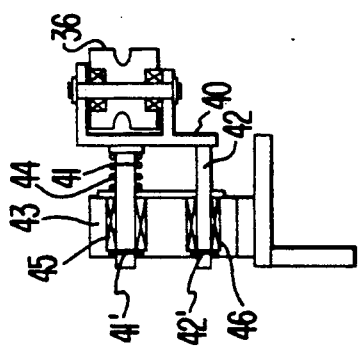

FIG. 5 is a sectional view taken substantially along the line Z—Z of FIG. 2.

Rollers 109 and 110 are each composed of a shaft 114 and an elastic material 115 such as a sponge, these rollers being rotatably supported on brackets 112 through bearings 116.

Rollers 111 are likewise supported on brackets 112 through bearing 117 and so linked as to rotate in synchronism with carrier driving rollers 106 for steel cord fabric A by means of a known rotary driving transmission unit (illustration is omitted). The rotary driving transmission unit may involve a flexible coupling or a combination of a bevel gear and a chain sprocket.

The description will be focused on the operation of the present apparatus.

A widthwise half of each of adhesive rubber tapes B and B' fed to both ends of the upper surface of steel cord fabric A is bonded to the upper surface of steel cord fabric A by means of press rollers 104. Next, rubber tapes B and B' are folded downwards at the upper angular portions of the end surfaces of steel cord fabric A by use of oblique rollers 109. Each surface of oblique rollers 109 is formed of a transformable elastic material 115 such as a sponge, the configuration of which is variable in accordance with shapes of the end portions of steel cord fabric A having rigidity. Adhesive rubber tape B having no rigidity is press-fitted to the end surfaces of steel cord fabric A. (see FIG. 3)

Subsequent to this step, adhesive rubber tape B is folded at the lower angular portions of end surface of steel cord fabric A by use of oblique rollers 110. (see FIG. 4)

As illustrated in FIG. 5, taper rollers 111 act to press-fit the unbonded portion of adhesive rubber tape B to the lower surface of steel cord fabric A.

Finally, adhesive rubber tape B passes through between fabric carrier driving rollers 106 and press rollers 108 disposed above rollers 106, whereby the tape is securely press-fitted around the both ends of steel cord fabric A.

As discussed above, the tape bonding apparatus according to the present invention comprises: the carrier unit for carrying the steel cord fabric; the supply unit for supplying the adhesive rubber tape; and the folding-/bonding unit for folding and bonding the adhesive rubber tape to the peripheral portions of two ends of the steel cord fabric, the folding/bonding unit including: the press rollers for bonding the widthwise half portion of the adhesive rubber tape to both ends of the upper surface of the steel cord fabric; the oblique rollers for folding the unbonded portion of the adhesive rubber tape at both ends of the steel cord fabric; and the taper rollers for bonding the folded adhesive rubber tape to the steel cord fabric. Based on this construction, each surface of the oblique rollers is formed of the elastic material transformable in accordance with the shapes of the end surfaces of the steel cord fabric.

By virtue of the above-described arrangement, the present invention exhibits the following effects.

The surfaces of folding rollers 109 and 110 are formed of the transformable elastic materials, and these rollers are each mounted with inclinations to the direction in which the steel cord fabric is fed. With this arrangement, the necessity for the folding operation with hands at the initial end of the rubber tape can be eliminated.

Taper roller 111 is forcibly driven in synchronism with feed rollers 106 which cause velocity at which the steel cord fabric is carried, and the carrying velocity can thereby be increased. In consequence, the productivity is improved.

Although the illustrative embodiments of the present invention have been described in greater detail with reference to the accompanying drawings, it is to be understood that the invention is not limited to those precise embodiments. Various changes or modifications may be effected by one skilled in the art without departing from the scope or spirit of the invention.

What is claimed is:

1. An apparatus for applying adhesive rubber tape along at least one of two respectively opposing edges of a steel cord fabric, comprising:

feed means, including rotatably driven feed rollers, for feeding the steel cord fabric along a feed path;

supply means for supplying the adhesive rubber tape to said feed means; and folding/bonding means, for folding and bonding the adhesive rubber tape along the at least one edge of the steel cord fabric, comprising means, including a press roller, for pressing about half of the width of the adhesive rubber tape onto an upper surface of the steel cord fabric along the at least one edge thereof to bond the adhesive rubber tape to the steel cord fabric, means, including oblique rollers having surfaces formed of elastic material which is conformable to the shape of the edges of the steel cord fabric, for folding an unbonded portion of the adhesive rubber tape about the edges of the steel cord fabric, said oblique rollers comprising at least two oblique rollers on at least one side of the path of the steel cord fabric, each of said oblique rollers being inclined at a different angle relative to the path of the steel cord fabric, one of said at least two oblique rollers on the at least one side of the path being mounted at an angle relative to the path such that it faces the upper surface of the steel cord and another of said at least two oblique rollers on the at least one side of the path being mounted at an angle relative to the path such that it faces a lower surface of the steel cord fabric, means, including a taper roller, for press-fitting the folded portion of the adhesive rubber tape onto the steel cord fabric to bond the adhesive rubber tape in position about the at least one edge of the steel cord fabric, and means for forcing said taper roller to rotate in synchronism with said driven feed rollers even if slippage occurs between the steel cord fabric and said taper roller.

2. An apparatus as recited in claim 1, wherein
said taper roller means is mounted along the path between said press rollers and said oblique rollers.

3. An apparatus as recited in claim 1, wherein
said folding/bonding means is operable to fold and bond adhesive rubber tape along both edges of the steel cord fabric.

* * * * *